May 14, 1968  I. CHICHESTER-MILES  3,383,075
AIRCRAFT

Filed May 5, 1965  4 Sheets-Sheet 1

May 14, 1968

I. CHICHESTER-MILES 3,383,075

AIRCRAFT

Filed May 5, 1965

Inventor
Ian Chichester-Miles

By
Dowell & Dowell
Attorneys

May 14, 1968   I. CHICHESTER-MILES   3,383,075
AIRCRAFT

Filed May 5, 1965   4 Sheets-Sheet 4

3,383,075
AIRCRAFT
Ian Chichester-Miles, Harpenden, England, assignor to Hawker Siddeley Aviation Limited, Surrey, England
Filed May 5, 1966, Ser. No. 547,819
Claims priority, application Great Britain, May 6, 1965, 19,257/65; Oct. 13, 1965, 43,487/65
14 Claims. (Cl. 244—56)

ABSTRACT OF THE DISCLOSURE

An arrangement for a V/STOL aircraft of swivelling lift engines disposed in a pod in at least one fore-and-aft row, wherein each engine is pivotally mounted to swivel about a substantially horizontal axis transverse to the pod, which axis does not intersect the main axis of center line of the engine but is offset to the forward or aft side of the engine casing (considering the engine in the vertical lift position).

Description of invention

Figure 1:
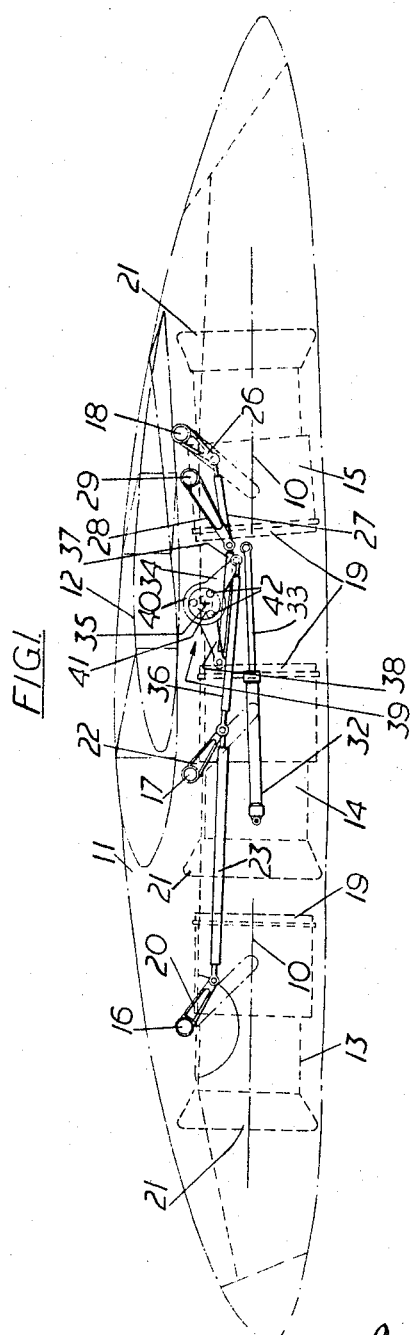

This invention relates to aircraft, and more particularly to aircraft having a vertical or short take-off and landing capability.

To give V/STOL capability in the larger sizes of aircraft it is known to provide a comparatively large number of jet lift engines disposed with their axes substantially vertical so as to direct the jet effluxes downward, and which may be housed in rows in pods secured to the wings or fuselage. It is advantageous to provide each such engine with a pivotal mounting so that the engine thrust can be directed at will rearwardly as well as downwardly, which serves both to facilitate transition between the vertical lift mode and normal forward flight and also to minimise ground erosion when the engines are run up prior to take-off. Furthermore, turning the engine from the vertical lift position to a substantially horizontal orientation affords a means of retracting the engine into the pod when not required. A primary object of this invention is to provide a mounting and housing arrangement for lift engines in a pod which arrangement is economical of space while allowing each engine to swivel in the manner desired.

According to the invention each engine is pivotally mounted to swivel about a substantially horizontal axis transverse to the pod, which axis does not intersect the main axis or centre line of the engine but is offset to the forward or aft side of the engine casing (considering the engine in the vertical lift position). In the preferred form, each engine is arranged to turn about its pivot axis from a vertical lift position to a retracted or stowed position in which it is underhung with respect to the pivot.

Offsetting the pivot axis of each engine in this way, from the conventional position intersecting the engine centre line, enables the engines to be more compactly disposed in the pod, as well as having other advantages which will be apparent as the description proceeds.

In the preferred arrangement, a rearmost engine, or pair of engines, swings into a substantially horizontal stowed position by turning in the opposite angular direction to the other engines in front, while nevertheless, when the engines are operative each is able to swing through an arc from a position in which the jet efflux is directed downwardly and rearwardly to a position in which it is directed downwardly and forwardly, and during adjustment of the angular position within this operating range all the engines swing together in the same direction. To achieve these various angular movements without undue mechanical complication or weight penalty, the lift engines that are required to turn sometimes in the same angular direction and sometimes in opposite directions may be operatively-connected to the same actuating jack or jacks, and one train of operative connections, preferably that train connected to the smaller number of engines, may include a reversing gear assembly whereby movement in the same or opposite angular directions is selectable as required. In the preferred form, the reversing gear assembly is of the epicyclic type.

Figure 3:
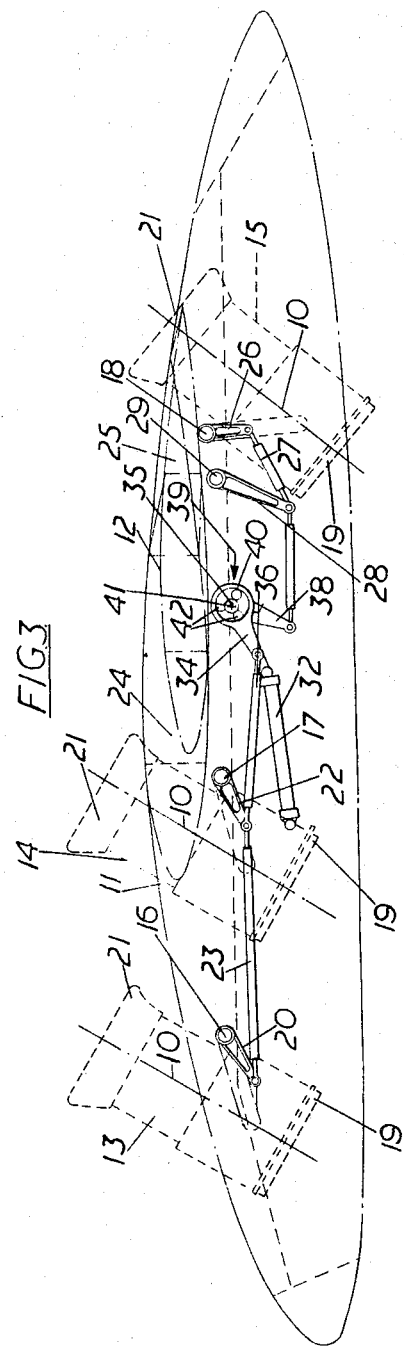
Figure 4:
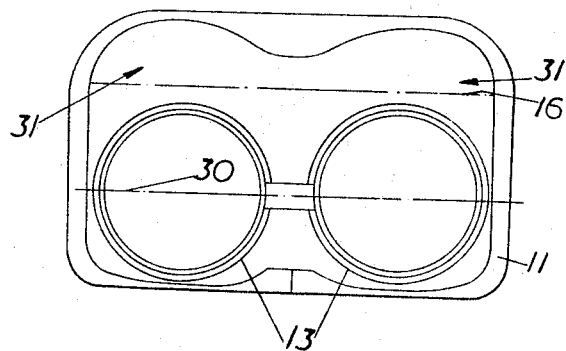

One arrangement in accordance with the invention will now be described by way of example and with reference to the accompanying drawings, in which:

FIGURE 1 is a diagram, in longitudinal view, of the layout of an aircraft pod housing retractable swivelling lift engines and showing the engines in the stowed positions; FIGURES 2 and 3 are similar diagrams showing the swivelling engines in other angular positions; and FIGURE 4 is a diagram illustrating the pod cross section on the line 4—4 of FIGURE 1.

In the arrangement illustrated a pod 11 is secured at the underside of an aircraft wing 12 and houses six lift engines arranged in a fore-and-aft row of three pairs of engines 13, 14 and 15, the engines of each pair being side by side. Each engine pair is mounted to turn bodily about a respective pivot 16, 17, 18 through a range of angular positions. The positions of the engines shown in FIGURE 1 are the retracted or stowed positions in which it will be seen that the engines are all underhung in relation to their pivots 16, 17, 18, these pivots being disposed rather high up in the pod. The forward and centre engines 13, 14 occupy stowed positions in which each has its jet nozzle 19 to the rear. Each engine of the rear pair 15 turns from the vertical lift position to the stowed position in the opposite direction to the other two engine pairs, and therefore the rear engine pair when stowed has its jet nozzles 19 forward; these nozzles of the rear engine pair are slightly tilted down in the stowed position, as shown.

In the vertical lift positions of the three pairs of engines, that is to say when the longitudinal axes 10 of the engines are vertical, the air intakes 21 of all three engine pairs project above the pod.

FIGURE 2 illustrates "ground run" positions of the engines, in which the nozzles are directed downward and rearward; these are the angular positions in which the engines are placed while being run up before take off, thereby to allow the jet effluxes to be directed out of the pod while keeping ground erosion to an acceptable minimum. Reverse thrust positions are shown in FIGURE 3, in which the jet nozzles are directed downward and somewhat forward. The forward and middle engines 13, 14 swing from the stowed position through the "ground run" position to the reverse thrust position but in the case of the rear engine pair 15 the reverse thrust angular position is intermediate the stowed position and the "ground run" position. It will be observed that angular movement of the forward and middle engines 13, 14 is about 120° from the reverse thrust to the stowed position, while the rear engine pair 15 has to turn rather more than this in moving from the ground run position to the stowed position.

A particular feature of the arrangement is that, while the wing section intersects the pod form in the usual way, there is substantially no waste space at this portion of the pod length. With a construction in which the lift engines were mounted each with its pivot axis intersecting the engine centre line there would have to be an appreciable space in the pod under the wing between the middle and rear engines in the stowed condition. But as can be seen in FIGURE 1, by offsetting the engine pivot axes, and arranging the centre and rear engines 14, 15 to turn into the stowed position in opposite directions, a disposition has been achieved in which these two engines extend under the wing 12 when stowed leaving hardly any unused pod length. This leads to a significant shortening of the pod. The leading and trailing edges of the wing are notched or recessed, as at 24 and 25, to allow the engines 14, 15 to swing into the lift position but this is acceptable so long as the spars are uninterrupted.

Another advantage of mounting the engines on offset pivots displaced toward the top of the pod is that when the engines are in the lift positions the clearances between the jet nozzles and the ground are greater than in the case of conventional pivots through the engine centre lines.

These improvements in accommodation of the engines are achieved without any sacrifice of engine capability. Each engine has a clear intake and jet efflux path enabling it to operate continuously throughout the full angular range from the reverse thrust position (FIGURE 3) through the vertical to the ground run position (FIGURE 2). The swing from the vertical to the ground run position is particularly important in the transition between the jet lift mode of the aircraft and normal forward flight.

A further economy that flows from the offset pivot arrangement resides in the engine mountings themselves. If a jet engine is to be mounted to swivel about an axis passing through its centre line it is ordinarily necessary to provide on the engine casing substantial trunnion bearing points which are special in that they are different from or additional to the standard engine manufacturer's mounting points. But with the pivot offset it becomes possible to use the standard mounting points. Also it is easier to lead the necessary piping and cable services to the engine. In the case of a swivelling engine the services are normally ducted to the engine within the pivot itself which is hollow for this purpose. Now if the pivot axis intersects the engine centre line it will be understood that at the pivot end where the services must emerge there is very little room because this is in the region where the engine casing approaches closest to the side of the pod, e.g. on the axis 30 in FIGURE 4. But from a consideration of FIGURE 4 it is apparent that when the pivot is offset upwardly into the position shown, there is room in, so to speak, the corner 31 of the pod cross section where the engine does not approach closely to the pod wall and so the problem of access for the services is alleviated.

Referring again to FIGURES 1 to 3 the turning of all the engines is accomplished by a single hydraulic jack 32 which has its jack rod 33 pivotally connected to an arm 34 that turns about an axis 35. The front and middle engines 13, 14 are swung by cranks 20, 22 connected to one another by a link 23 and also coupled to the arm 34 by a further link 36. The rear engine 15 is swung by a crank 26 coupled by a link 27 to the free end of an arm 28 that turns about an axis 29, and further coupled by a second link 37 to an arm 38 that turns about the same axis 35 as the arm 34.

From a consideration of FIGURES 2 and 3, it is apparent that all the engines turn in the same direction and through the same amount in going from the "ground run" position to the "reverse thrust" position or vice versa. Therefore, it is required for this purpose that the coaxial arms 34, 38 shall turn as one through the same angle in the same angular direction. However, the stowing of the engines calls for swinging of the rear engine 15 in the opposite direction to the forward and middle engines, or in other words the arms 34, 38 must now turn in opposite directions. These requirements are met by providing epicyclic gearing 39 to couple the arms 34, 38.

The epicyclic gearing consists of an internally-toothed ring gear 40 on the arm 34, a sun gear 41 on the arm 38 and lying within the ring gear 40, and planet gears 42 between the sun gear 41 and the ring gear 40. When the two arms 34, 38 are to move as one, as when the engines are swinging between the "reverse thrust" and "ground run" positions, the planet gear carrier is locked either to the arm 34 or the arm 38. The planet gears are then unable to rotate on the carrier and the result is that the two arms become rigid with one another. When the two arms 34, 38 are required to swing in opposite directions to stow or unstow the engines, the planet gear carrier is locked to the fixed pod structure. Swinging of the arm 34 fixed to the ring gear 40 then causes the planet gears to rotate, with the result that the sun gear 41 and the arm 38 swing in the opposite direction to the arm 34. The ratio of the angular movements of the arms 34 and 38 depends on the choice of the respective numbers of teeth on the gears.

Thus, the arrangement illustrated enables the required angular movements of the several engines to be achieved without the complication and weight penalty of a number of differently-sited hydraulic jacks.

The arrangement illustrated can, of course, be modified without departing from the scope of the invention. For example, the effort for turning the engines could be applied through chains or cables rather than the system of interconnecting links described and shown.

If desired, the pod can be still further shortened by adopting tilted rather than horizontal stowed positions of the engines, at the expense of the pod being a little larger in cross section.

What we claim is:

1. An arrangement, for a V/STOL aircraft of swivelling lift engines disposed in a pod in at least one fore-and-aft row, wherein each engine is pivotally mounted to swivel about a substantially horizontal axis transverse to the pod, which axis does not intersect the main axis or centre line of the engine but is offset to the forward or aft side of the engine casing, considering the engine in the vertical lift position.

2. An arrangement according to claim 1, wherein each engine is arranged to turn about its pivot axis from a vertical lift position to a retracted or stowed position in which it is underhung with respect to the pivot.

3. An arrangement according to claim 2, wherein different engines in the row are arranged to turn from their stowed positions to their lift positions in opposite angular directions so that when stowed the jet nozzles of some engines face rearward and that of at least one onther engine faces forward.

4. An arrangement according to claim 3, wherein the pod is mounted under an aircraft wing, with the wing structure intersecting the upper part of the pod form, and when the engines are stowed the space in the pod under the wing provides the whole or a substantial part of the stowage volume required for two consecutive engines in the row which lie stowed with their jet nozzles facing toward one another.

5. An arrangement according to claim 4, wherein there are three engines in the row and the engines stowed under the wing are the middle and rear engines.

6. An arrangement according to claim 5, wherein the front engine lies stowed with its jet nozzle facing rearward.

7. An arrangement according to claim 6, wherein the leading and trailing edges of the wing have notches or recesses, within the pod, to enable the engines stowed under the wing to turn into the lift position.

8. An arrangement according to claim 1, wherein all the engines in the row are arranged to turn together through the vertical between a "ground run" position, in which the jet nozzles are directed downward and rearward and a "reverse thrust" position, in which the nozzles are directed downward and forward.

9. An arrangement according to claim 1, wherein there are two rows of engines in the pod side by side, each engine in one row being paired on a common pivotal mounting with an engine alongside it in the other row.

10. An arrangement according to claim 8, wherein different engines in the row are arranged to turn from their stowed positions to their lift positions in opposite angular directions so that when stowed the jet nozzles of some engines face rearward and that of at least one engine faces forward, the lift engines that are required to turn sometimes in the same angular direction and sometimes in opposite directions are operatively-connected to the same actuating jack or jacks, and one train of operative connections includes a reversing gear assembly whereby movement in the same or opposite angular directions is selectable as required.

11. An arrangement according to claim 10, wherein the reversing gear assembly is included in the operative connections to the smaller number of engines.

12. An arrangement according to claim 11, wherein the reversing gear is of the epicyclic type.

13. An arrangement according to claim 12, and comprising two swinging lever arms operatively connected to one another by said reversing gear assembly, one lever arm being acted on by an actuating jack and being coupled to turn one group of engines, and the other lever arm being coupled to turn the other engine or group of engines.

14. An arrangement according to claim 13, wherein the two lever arms are mounted to turn about a common axis, and the epicyclic gear comprises a sun gear fast with one lever arm, an internally-toothed ring gear fast with the other lever arm, and planet gears between the sun and ring gears with a planet gear carrier that is releasably lockable to one of the arms.

References Cited
FOREIGN PATENTS 1,200,139    4/1962    Germany.

MILTON BUCHLER, *Primary Examiner.*

B. BELKIN, *Assistant Examiner.*